United States Patent [19]

Iwagami et al.

[11] 4,369,450

[45] Jan. 18, 1983

[54] PRINTER HEAD IN AN INK JET SYSTEM PRINTER

[75] Inventors: Fusao Iwagami, Higashiosaka; Hiroji Iwai, Yamatokoriyama, both of Japan

[73] Assignee: Sharp Kabushiki Kaisha, Osaka, Japan

[21] Appl. No.: 204,922

[22] Filed: Nov. 7, 1980

[30] Foreign Application Priority Data

Nov. 8, 1979 [JP] Japan ................................ 54-145132

[51] Int. Cl.[3] ............................................ G01D 15/18

[52] U.S. Cl. .................................. 346/75; 346/140 R

[58] Field of Search .............. 346/75, 140 R, 140 PD, 346/140 IJ; 400/126

[56] References Cited

U.S. PATENT DOCUMENTS 3,854,399 12/1974 Keur et al. ........................ 346/75 X
3,981,020 9/1976 Takano et al. ........................ 346/75

FOREIGN PATENT DOCUMENTS 55-21231 2/1980 Japan .................................... 346/75
55-61473 5/1980 Japan .................................... 346/75
55-61478 5/1980 Japan .................................... 346/75

*Primary Examiner*—A. D. Pellinen
*Assistant Examiner*—W. J. Brady
*Attorney, Agent, or Firm*—Birch, Stewart, Kolasch & Birch

[57] ABSTRACT

An ink jet system printer has a printer head for emitting ink droplets toward a recording paper. Objectional ink mist is inevitably formed and diffused in various directions after the ink droplets impinge upon the recording paper. The printer head includes a first chamber for introducing the ink mist diffused in front of the printer head, a second chamber for accommodating an ink droplet issuance unit for emitting the ink droplets, and a fan system for creating an air flow directed from the first chamber to the second chamber, thereby effectively introducing the ink mist into the first chamber. A filter member is disposed in the first chamber for removing the ink mist introduced into the first chamber. The ink droplet issuance unit is disposed in the second chamber so that a stream of the ink droplets is inclined from a line perpendicular to the surface of the recording paper.

7 Claims, 4 Drawing Figures

PRINTER HEAD IN AN INK JET SYSTEM PRINTER

BACKGROUND AND SUMMARY OF THE INVENTION

The present invention relates to a printer head in an ink jet system printer.

In an ink jet system printer, ink droplets emitted from a nozzle are directed to a recording paper and impinge upon the recording paper. Objectionable ink mist is inevitably formed and diffused in various directions after the ink droplets impinge upon the recording paper. The thus generated ink mist will deteriorate the print quality by attaching to the recording paper, and affect the print accuracy by attaching to, for example, deflection electrodes.

Accordingly, an object of the present invention is to provide a printer head for ensuring clean and accurate printing in an ink jet system printer.

Another object of the present invention is to provide a printer head in an ink jet system printer for minimizing the occurrence of ink mist and removing the ink mist inevitably formed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an ink droplet issuance unit is secured in a casing which is driven to travel across the printing area. The ink droplet issuance unit is disposed in the casing in a manner that the axis thereof is slightly inclined toward the travel direction of the casing from the line perpendicular to the travel direction or the recording paper surface. Therefore, the ink droplet stream is slightly inclined from the line perpendicular to the recording paper surface, thereby minimizing the formation of the ink mist. A fan mechanism is disposed in the casing in order to introduce the ambience air from the front portion of the casing into the interior thereof. A filter is disposed in the course of the air flow created by the fan mechanism for removing the ink mist which is diffused in the ambience air.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
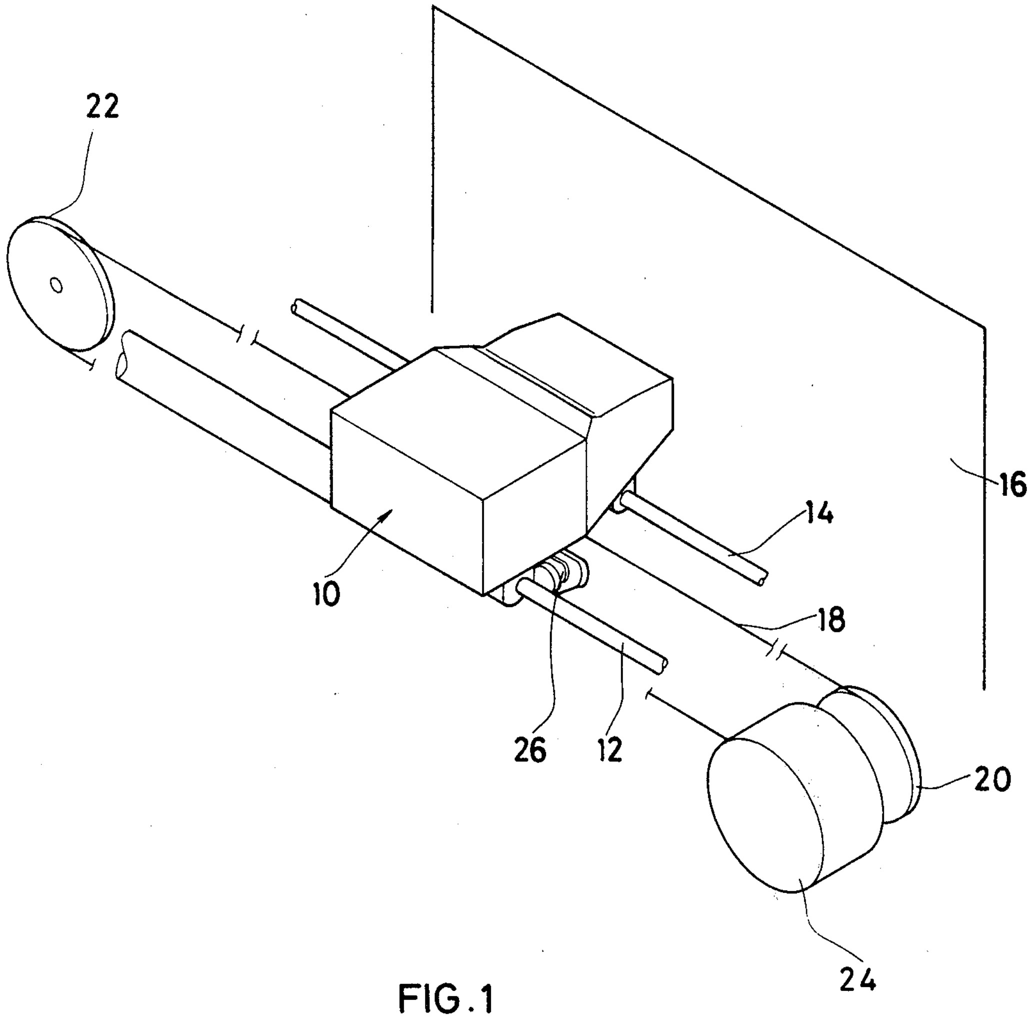
FIG. 1 is a perspective view of an embodiment of a printer head of the present invention.

Referring to FIG. 1, a printer head 10 is slidably mounted on parallel shafts 12 and 14, and driven to reciprocate along a recording paper 16 through the use of a wire 18 which is extended between pulleys 20 and 22. The printer head 10 is fixed to a desired position of the wire 18, and a drive motor 24 is associated with the pulley 20. A cable 26 is secured to the printer head 10 to supply ink liquid and a control signal to an ink droplet issuance unit disposed in the printer head 10.

Figure 2:
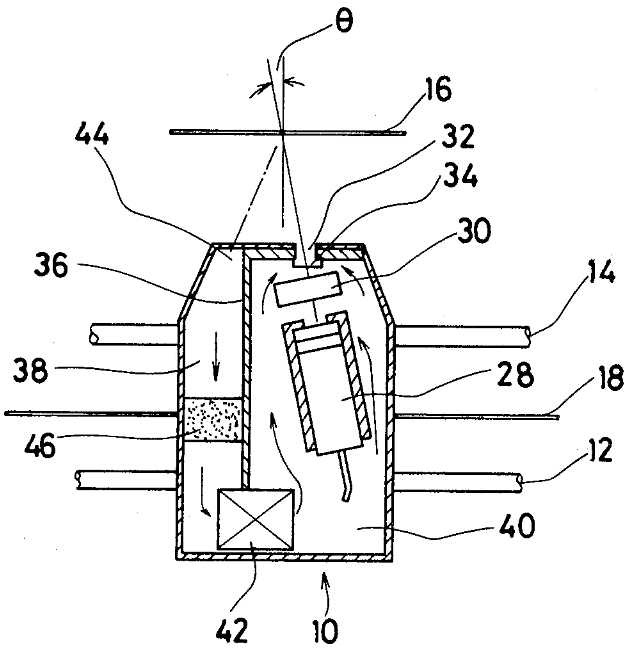
FIG. 2 is a schematic sectional view of the printer head of FIG. 1.

FIG. 2 schematically shows the interior of the printer head 10.

An ink droplet issuance unit 28 is disposed in the printer head 10. Ink droplets emitted from the ink droplet issuance unit 28 are deflected in accordance with charge amounts carried thereon while they pass through a constant high voltage field established by a pair of deflection electrodes 30. The deflected ink droplets are directed to the recording paper 16 through an opening 32 formed in the front wall of the casing of the printer head 10. Ink droplets not contributing to the actual printing operation are not deflected, but are directed to a beam gutter 34 for recirculation purposes. The ink droplet issuance unit 28 is disposed in the printer head 10 in a manner that the stream of the ink droplets is inclined with respect to a line perpendicular to the recording paper 16 by an angle $\theta$ as shown in FIG. 2.

A partition wall 36 is disposed in the printer head 10 to divide the printer head 10 into a first chamber 38 and a second chamber 40. A fan system 42 is disposed in the printer head 10 for introducing the air from the first chamber 38 and developing the air toward the second chamber 40. An open end 44 is formed in the first chamber 38 for introducing the ambience air into the first chamber 38. A filter member 46 is disposed in the first chamber 38 for removing the ink mist included in the ambience air which is introduced into the first chamber 38 by the fan system 42 through the open end 44.

The ink droplet issuance unit 28 is disposed in the second chamber 40. Since the ink droplet issuance unit 28 is inclined toward the open end 44, the ink mist developed from the recording paper 16 is effectively introduced into the first chamber 38. The air flow introduced into the second chamber 40 is exhausted through the opening 32. Accordingly, the ink mist is not introduced into the second chamber 40 through the opening 32. Therefore, there is no possibility that the ink mist will attach to, for example, the deflection electrodes 30.

Figure 3:
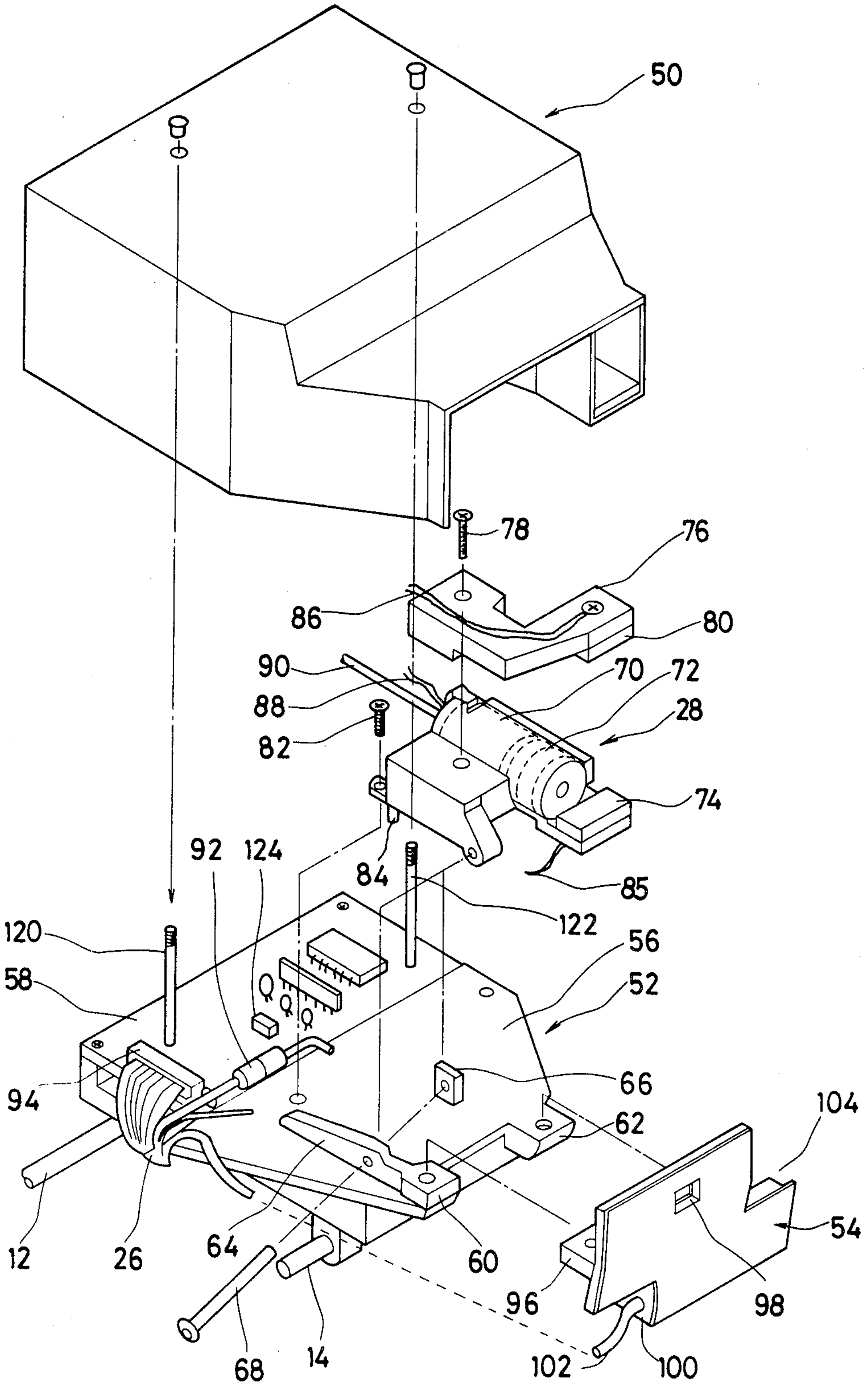
FIG. 3 is an exploded perspective view of the printer head of FIG. 1.
Figure 4:
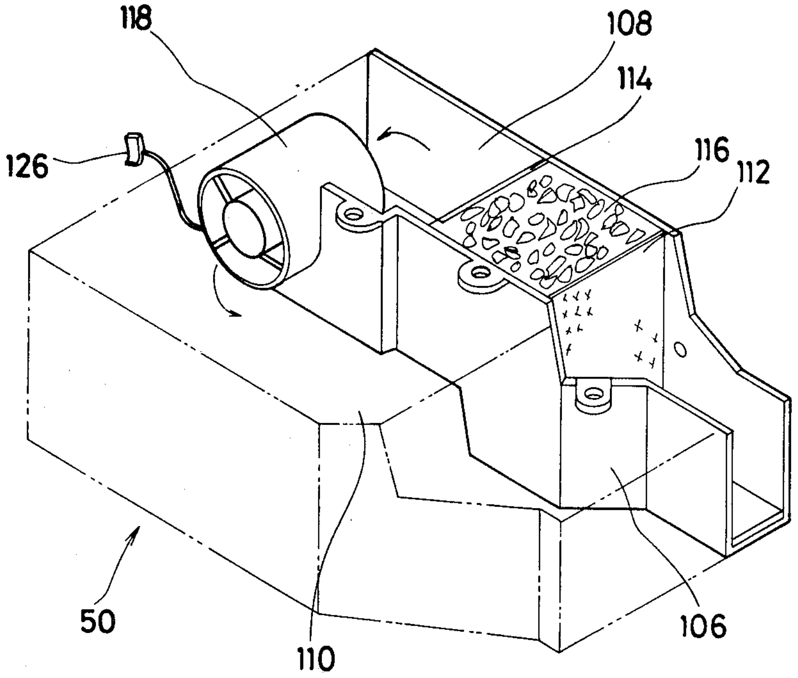
FIG. 4 is a perspective view of a cover included in the printer head of FIG. 1.

FIGS. 3 and 4 show the construction of the printer head 10 of the present invention in detail.

The printer head 10 comprises a cover casing 50, a base member 52 and a front wall 54. The base member 52 includes a bed portion 56 for supporting the ink droplet issuance unit 28, and a circuit board 58 for supporting the control circuit of the ink jet system printer. The bed portion 56 includes protrusions 60 and 62 to which the front wall 54 is fixed through the use of screws. Supporting elements 64 and 66 are secured to the bed portion 56 for supporting the ink droplet issuance unit 28 through the use of a shaft 68.

The ink droplet issuance unit 28 comprises a nozzle assembly 70 for emitting ink droplets at a given frequency, and a charging tunnel 72 for charging the ink droplets in accordance with print information. A lower deflection electrode 74 is fixed to the ink droplet issuance unit 28. An angled member 76 is secured to the ink droplet issuance unit 28 through the use of a screw 78, the angled member 76 supporting an upper deflection electrode 80. The ink droplet issuance unit 28 is secured to the base member 52 through the use of the shaft 68 and a screw 82. A sring 84 is disposed below the ink droplet issuance unit 28, thereby adjusting the direction of the stream of the ink droplets through the use of the screw 82.

Wires 85 and 86 are provided for applying a constant high voltage between the upper deflection electrode 80 and the lower deflection electrode 74. A lead wire 88 is connected to the nozzle assembly 70 for applying a drop formation signal and a charging signal to an electromechanical transducer included in the nozzle assembly 70 and the charging tunnel 72, respectively. An ink conduit 90 is connected to the nozzle assembly 70 for supplying ink liquid to the nozzle assembly 70. The ink conduit 90 is connected to a coupler 92, which is connected to the cable 26 for introducing the ink liquid from an ink liquid reservoir into the nozzle assembly 70. The wires 85, 86 and 88 are also communicated with the cable 26. The cable 26 is connected to the circuit board 58 via a connector 94.

The front wall 54 comprises a protrusion 96 which is associated with the protrusions 60 and 62 for fixing the front wall 54 to the bed portion 56. An opening 98 is formed in the front wall 54, through which the deflected ink droplets are issued toward the recording paper 16. The beam gutter is secured to the front wall 54 for collecting the ink droplets not contributing to the actual printing operation. The ink liquid collected by the beam gutter is introduced into a groove 100 and returned to the ink liquid reservoir through a conduit 102 and the cable 26. A cut portion 104 is formed in the front wall 54 to form an inlet for the air.

FIG. 4 shows the interior of the cover casing 50. A partition wall 106 is disposed in the cover casing 50 to divide the interior into a first chamber 108 and a second chamber 110. The first chamber 108 is designed to communicate with the cut portion 104 formed in the front wall 54. The second chamber 110 is designed to accommodate the ink droplet issuance unit 28. Metal mesh plates 112 and 114 are disposed in the first chamber 108 for supporting filter members 116 disposed therebetween. A fan system 118 is disposed in the cover casing 50 for creating air flow directed from the first chamber 108 to the second chamber 110. More specifically, the ambience air is introduced through the cut portion 104 into the first chamber 108, and the ink mist is removed by the filter members 116. And, the clean air is introduced into the second chamber 110 and exhausted through the opening 98.

The cover casing 50 is secured to the base member 52 through the use of supporting rods 120 and 122. The fan system 118 receives the power supply through connectors 124 and 126. The fan system 118 must have the ability to effectively introduce the ink mist diffused in front of the printer head 10, and not to disturb the ink droplet travel emitted from the issuance unit 28 and passing through the opening 98. A preferred fan system is a miniature fan, model "V241L", manufactured by Micronel AG.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A printer head for an ink jet system printer, which emits ink droplets toward a recording medium, whereby an ink mist is formed and diffused after the ink droplets impinge upon said recording medium, said printer head comprising:

an ink droplet issuance unit for emitting said ink droplets toward the recording medium; and a fan system within said printer head for withdrawing said ink mist produced into said printer head.

2. A printer head for an ink jet system printer which emits ink droplets toward a recording medium whereby an ink mist is formed and diffused as a result of said ink droplets impinging upon said recording medium, said printer head comprising:

a housing having two chambers, a first chamber into which said ink mist is introduced and a second chamber for accommodating an ink droplet issuance unit which emits said ink droplets toward said recording medium, said housing comprising a front wall provided with two openings, a first opening associated with said first chamber through which said ink mist is introduced into said first chamber and a second opening associated with said second chamber for passing said ink droplets emitted from said ink droplet issuance unit toward said recording medium; and a fan system within said printer head positioned between said first and second chambers for withdrawing said ink mist produced from in front of said printer head into said first chamber of said printer head.

3. The printer head of claim 2, wherein said fan system is disposed between said first chamber and said second chamber for creating an air flow directed from said first chamber to said second chamber.

4. The printer head of claim 3, wherein said air flow introduced into said second chamber is exhausted through said second opening formed in said front wall.

5. The printer head of claim 2, 3 or 4, further comprising:

filter means disposed in said first chamber for removing the ink mist included in the air introduced into said first chamber.

6. The printer head of claim 2, 3 or 4, further comprising:

drive means for reciprocating said printer head along said recording medium.

7. The printer head of claim 6, wherein said ink droplet issuance unit is disposed in said second chamber so that a stream of the ink droplets emitted from said ink droplet issuance unit is inclined by a predetermined angle from a line perpendicular to a surface of said recording medium.

* * * * *